US010369507B2

(12) United States Patent
Hedlund

(10) Patent No.: US 10,369,507 B2
(45) Date of Patent: Aug. 6, 2019

(54) FILTER FRAME

(71) Applicant: Camfil AB, Stockholm (SE)

(72) Inventor: Kenny Hedlund, Trosa (SE)

(73) Assignee: CAMFIL AB, Stockholm (SE)

( * ) Notice: Subject to any disclaimer, the term of this patent is extended or adjusted under 35 U.S.C. 154(b) by 460 days.

(21) Appl. No.: 14/427,605

(22) PCT Filed: Dec. 5, 2012

(86) PCT No.: PCT/EP2012/074545
§ 371 (c)(1),
(2) Date: Mar. 11, 2015

(87) PCT Pub. No.: WO2014/040657
PCT Pub. Date: Mar. 20, 2014

(65) Prior Publication Data
US 2015/0224434 A1    Aug. 13, 2015

(30) Foreign Application Priority Data

Sep. 12, 2012  (WO) .................. PCT/EP2012/067746
Sep. 21, 2012  (WO) .................. PCT/EP2012/068707

(51) Int. Cl.
*B01D 46/00*   (2006.01)
*B01D 46/12*   (2006.01)
*B01D 46/52*   (2006.01)

(52) U.S. Cl.
CPC ....... *B01D 46/125* (2013.01); *B01D 46/0002* (2013.01); *B01D 46/0005* (2013.01);
(Continued)

(58) Field of Classification Search
None
See application file for complete search history.

(56) References Cited

U.S. PATENT DOCUMENTS 2,197,120 A    4/1940  Bergmann
2,602,548 A    7/1952  Griffiths
(Continued)

FOREIGN PATENT DOCUMENTS

CN    1668363 A    9/2005
CN    1679994 A   10/2005
(Continued)

OTHER PUBLICATIONS

International Search Report PCT/ISA/210 for International Application No. PCT/EP2012/074545 dated Feb. 7, 2013.
(Continued)

*Primary Examiner* — Duane Smith
*Assistant Examiner* — Brit E. Anbacht
(74) *Attorney, Agent, or Firm* — Harness, Dickey & Pierce, P.L.C.

(57) ABSTRACT

The present invention relates to a filter frame for receiving a media pack, the filter frame comprising a front plate, and first and second gable plates arranged at opposite ends of the front plate. The front plate comprises a groove at each of the ends and a front edge portion of each gable plate is received in a respective one of the grooves. Each gable plate comprises a retainment member arranged at the front edge portion, which retainment member has been engaged with a complementary retainment member of the front plate. The invention also relates to a filter assembly and a method for assembling a filter frame.

9 Claims, 8 Drawing Sheets

(52) U.S. Cl.
CPC ..... *B01D 46/0019* (2013.01); *B01D 46/0023* (2013.01); *B01D 46/0026* (2013.01); *B01D 46/0047* (2013.01); *B01D 46/521* (2013.01); *B01D 2201/0415* (2013.01); *B01D 2265/028* (2013.01); *B01D 2265/06* (2013.01); *B01D 2271/022* (2013.01); *Y10T 29/49826* (2015.01)

(56) References Cited

U.S. PATENT DOCUMENTS

| | | | |
|---|---|---|---|
| 2,808,237 A | 10/1957 | Fosnes | |
| 2,857,017 A | 10/1958 | Nutting | |
| 2,965,933 A | 12/1960 | Kasten | |
| 3,470,680 A * | 10/1969 | Avera | B01D 46/125 210/483 |
| 3,494,113 A | 2/1970 | Kinney | |
| 4,364,751 A | 12/1982 | Copley | |
| 4,483,769 A | 11/1984 | Sherman | |
| 4,732,675 A | 3/1988 | Badolato et al. | |
| 5,240,487 A | 8/1993 | Kung | |
| 5,487,767 A | 1/1996 | Brown | |
| 5,512,074 A * | 4/1996 | Hanni | B01D 46/0005 55/484 |
| 5,525,145 A | 6/1996 | Hodge | |
| 5,584,988 A | 12/1996 | Hashimoto et al. | |
| 5,597,392 A | 1/1997 | Hawkins et al. | |
| 5,618,419 A | 4/1997 | Fuerst | |
| 5,728,292 A | 3/1998 | Hashimoto et al. | |
| 6,110,260 A | 8/2000 | Kubokawa | |
| 6,248,155 B1 | 6/2001 | Seaman | |
| 6,279,570 B1 | 8/2001 | Mittelstadt et al. | |
| 6,294,004 B1 | 9/2001 | Summers et al. | |
| 6,402,800 B1 | 6/2002 | Rey | |
| 6,447,566 B1 | 9/2002 | Rivera et al. | |
| 6,485,538 B1 | 11/2002 | Toyoshima | |
| 6,656,243 B2 | 12/2003 | Hodge | |
| 6,955,696 B1 * | 10/2005 | Ost | B01D 46/0005 210/470 |
| 6,955,702 B2 | 10/2005 | Kubokawa et al. | |
| 7,048,035 B2 | 5/2006 | Farag | |
| 7,425,274 B1 | 9/2008 | Helfet | |
| 7,588,629 B2 * | 9/2009 | Osborne | B01D 24/00 55/482 |
| 7,789,928 B2 | 9/2010 | Stepp | |
| 8,110,099 B2 | 2/2012 | Hersey et al. | |
| 8,142,537 B2 | 3/2012 | Braithwaite et al. | |
| 8,523,972 B2 * | 9/2013 | Borkent | B01D 46/0023 55/484 |
| 8,887,719 B2 | 11/2014 | Billingsley et al. | |
| 8,926,725 B2 * | 1/2015 | Loken | B01D 46/125 55/484 |
| 9,205,359 B2 * | 12/2015 | Kelmartin | B01D 46/0002 |
| 9,492,768 B2 | 11/2016 | Fick et al. | |
| 9,610,528 B2 * | 4/2017 | Porbeni | B01D 46/0002 |
| 2003/0085167 A1 | 5/2003 | Fox et al. | |
| 2003/0145568 A1 | 8/2003 | Hodge | |
| 2004/0074387 A1 | 4/2004 | Jaisinghani | |
| 2004/0129629 A1 | 7/2004 | Malgorn et al. | |
| 2004/0159598 A1 | 8/2004 | Fox et al. | |
| 2004/0238434 A1 | 12/2004 | Fisher et al. | |
| 2005/0023209 A1 | 2/2005 | Clausen et al. | |
| 2005/0217488 A1 * | 10/2005 | Tanahashi | B01D 46/526 96/129 |
| 2006/0150816 A1 | 7/2006 | Jaisinghani | |
| 2006/0163121 A1 | 7/2006 | Fisher et al. | |
| 2006/0180534 A1 | 8/2006 | Fox et al. | |
| 2006/0231483 A1 | 10/2006 | Malgorn et al. | |
| 2007/0187303 A1 | 8/2007 | Fisher et al. | |
| 2007/0204577 A1 * | 9/2007 | Devine | B01D 46/0005 55/497 |
| 2007/0204578 A1 | 9/2007 | Sundvik et al. | |
| 2008/0045135 A1 | 2/2008 | Pfannenberg | |
| 2008/0078712 A1 | 4/2008 | Enokida et al. | |
| 2009/0193773 A1 * | 8/2009 | Sundvik | B01D 46/125 55/478 |
| 2010/0236203 A1 | 9/2010 | Suzuki et al. | |
| 2010/0307118 A1 | 12/2010 | Kawano et al. | |
| 2010/0313760 A1 | 12/2010 | Crabtree et al. | |
| 2011/0062065 A1 | 3/2011 | McCague | |
| 2011/0067368 A1 * | 3/2011 | Handley | B01D 46/103 55/486 |
| 2011/0252759 A1 * | 10/2011 | Nicholas | B01D 46/0005 55/497 |
| 2012/0011817 A1 | 1/2012 | Borkent et al. | |
| 2012/0055127 A1 | 3/2012 | Holzmann et al. | |
| 2012/0067013 A1 | 3/2012 | Antony et al. | |
| 2012/0067323 A1 | 3/2012 | Patwardhan et al. | |
| 2013/0067875 A1 | 3/2013 | Hartmann et al. | |
| 2013/0153173 A1 | 6/2013 | Nakamura | |
| 2014/0034565 A1 * | 2/2014 | Loken | B01D 46/125 210/232 |
| 2014/0053634 A1 | 2/2014 | Woolard et al. | |
| 2014/0096493 A1 * | 4/2014 | Kelmartin | B01D 46/0002 55/482 |
| 2014/0373493 A1 | 12/2014 | Cannon | |
| 2015/0075125 A1 * | 3/2015 | Porbeni | B01D 46/0002 55/499 |
| 2015/0202560 A1 | 7/2015 | Jarrier et al. | |
| 2015/0224433 A1 | 8/2015 | Lans | |
| 2015/0224434 A1 * | 8/2015 | Hedlund | B01D 46/0005 55/482 |
| 2015/0246308 A1 * | 9/2015 | Lans | B01D 46/125 55/497 |
| 2015/0290573 A1 | 10/2015 | Hugert | |
| 2015/0336034 A1 | 11/2015 | Carrion | |
| 2016/0076497 A1 | 3/2016 | Jokschas et al. | |
| 2017/0050136 A1 | 2/2017 | Poon et al. | |
| 2017/0282107 A1 * | 10/2017 | Hugues | B01D 46/0001 |
| 2018/0117515 A1 * | 5/2018 | Hugues | B01D 46/0001 |

FOREIGN PATENT DOCUMENTS

| | | |
|---|---|---|
| CN | 101229463 A | 7/2008 |
| CN | 101234276 A | 8/2008 |
| CN | 202398240 U | 8/2008 |
| CN | 201461157 U | 5/2010 |
| CN | 101868291 A | 10/2010 |
| DE | 2739815 A1 | 9/1978 |
| DE | 20002124 U1 | 4/2000 |
| DE | 102010016504 A1 | 10/2011 |
| EP | 0082106 A2 | 6/1983 |
| EP | 1582248 A1 | 10/2005 |
| ES | 2551876 | 11/2015 |
| GB | 2364256 A | 1/2002 |
| JP | H06262020 A | 9/1994 |
| JP | 2008253886 A | 10/2008 |
| WO | WO-0051712 A1 | 9/2000 |
| WO | WO-0160137 A1 | 8/2001 |
| WO | WO-0197946 A1 | 12/2001 |
| WO | WO-200197946 A1 | 12/2001 |
| WO | WO-03013690 A1 | 2/2003 |
| WO | WO-2004069374 A1 | 8/2004 |
| WO | WO-2008001396 A1 | 1/2008 |
| WO | WO-2010151542 A2 | 12/2010 |
| WO | WO-2010151580 A1 | 12/2010 |

OTHER PUBLICATIONS

Chinese Office Action dated Dec. 3, 2015 issued in corresponding Chinese Application No. 201280075771.6 (with translation).
Chinese Search Report dated Nov. 10, 2015 issued in corresponding Chinese Application No. 201280075771.6.
Chinese Office Action dated Dec. 3, 2015 issued in corresponding Chinese Application No. 201280075763.1 (with translation).
Chinese Suppl. Search Report dated Aug. 5, 2016 issued in corresponding Chinese Application No. 201280075763.1.
Second Chinese Office Action dated Sep. 2, 2016 issued in corresponding Chinese Application No. 201280075763.1 (with translation).
Chinese Search Report dated Nov. 17, 2015 issued in corresponding Chinese Application No. 201280075763.1.

(56) References Cited

OTHER PUBLICATIONS

U.S. Office Action dated Oct. 4, 2016 issued in co-pending U.S. Appl. No. 14/427,522.
U.S. Office Action dated Oct. 6, 2016 issued in co-pending U.S. Appl. No. 14/427,584.
U.S. Office Action dated Nov. 4, 2016 issued in co-pending U.S. Appl. No. 14/427,392.
U.S. Appl. No. 14/427,584, filed May 15, 2015.
U.S. Appl. No. 14/427,609, filed Mar. 11, 2015.
U.S. Appl. No. 14/427,392, filed Mar. 11, 2015.
U.S. Appl. No. 14/427,522, filed Mar. 11, 2015.
U.S. Office Action dated Aug. 11, 2017 issued in related U.S. Appl. No. 14/427,609.
Notice of Allowance dated May 7, 2018 issued in copending U.S. Appl. No. 14/427,609.

* cited by examiner

FILTER FRAME

CROSS-REFERENCE TO RELATED APPLICATIONS

This application is a national phase under 35 U.S.C. § 371 of PCT International Application No. PCT/EP2012/074545 which has an International filing date of Dec. 5, 2012, which claims priority to International application number PCT/EP2012/067746, filed on Sep. 12, 2012 and PCT/EP2012/068707, filed on Sep. 21, 2012; the entire contents of each of which are hereby incorporated by reference.

FIELD OF THE INVENTION

The present invention relates to filter assemblies for removing particles from an air flow, and more particularly to a filter frame for receiving a media pack, a filter assembly comprising such a filter frame, and a method of assembling such a filter frame.

BACKGROUND OF THE INVENTION

Filter assemblies comprising media packs disposed in a frame structure are known. A media pack is typically formed from a sheet of filter media, e.g. a fiberglass sheet, or a nonwoven polyester sheet or membrane media or combinations thereof or the like, which is pleated to increase the effective filtering area of the filter body, and provided with cover plates. To provide mechanical support and/or to combine a plurality of media packs, the media pack is typically arranged in a frame structure.

A prior art filter frame for receiving several media packs is shown in U.S. Pat. No. 6,955,696, which discloses a filter frame comprising two gable plates, which have male connection elements, and two frame beams having female connection elements, which are interconnected with the male connection elements of the gable plates. Thereby a square frame is formed which supports the media packs. In other words, the media packs rest on the frame beams and on support structures of the gable plates. However, that structure requires a high rigidity of the two frame beams and a high stiffness of the media pack due to the small contact area with the frame. It would be desired to be able to mitigate these requirements.

SUMMARY OF THE INVENTION

It is an object of the present invention to provide a filter frame that eliminates, or at least reduces the drawbacks mentioned above.

The object is achieved by a filter frame according to the present invention as defined in claim 1 of the appended claims. The object is also achieved by a filter assembly as defined in claim 11 and a method of assembling a filter frame as defined in claim 12 of the appended claims.

Thus, in accordance with a first aspect of the present invention there is provided a filter frame for receiving a media pack, the filter frame comprising a front plate, and first and second gable plates arranged at opposite ends of the front plate and extending perpendicular or at an angle to the front plate. The front plate comprises a groove at each of said ends. A front edge portion of each gable plate has been received in a respective one of the grooves, and each gable plate comprises a retainment member arranged at the front edge portion. The retainment member has been engaged with a complementary retainment member of the front frame. By providing a full front plate and engage the gable plates with the front plate, a structure being more rigid in itself is obtained.

In accordance with an embodiment of the filter frame, the retainment member comprises a snap-lock element. Thereby a fast and precise assembly is obtained.

In accordance with an embodiment of the filter frame, the snap-lock element comprises a resilient tongue extending perpendicular or at an angle to a front edge of the gable plate, and having a shoulder; wherein the complementary retainment member comprises a recess; and wherein the shoulder has been received in the recess.

In accordance with an embodiment of the filter frame, the resilient tongue is arranged at a side edge of the gable plate, and wherein the recess is arranged at a rim of the front plate. Thereby the manufacturing of the gable plates including its snap-lock element is facilitated. It should be noted that more than one resilient tongue can be arranged, such as a second tongue at the opposite side edge of the gable plate.

In accordance with an embodiment of the filter frame, the retainment member comprises a protrusion protruding from the edge portion perpendicular to the primary extension of the gable plate; wherein the complementary retainment member comprises a notch arranged at a rim of the front plate; and wherein the protrusion has been received in the notch. The protrusion-notch pair is simple to manufacture and can be provided with a substantial strength at small dimensions. It should be noted that several protrusions, and complementary notches can be arranged, such as distributed along the length of the front edge portion.

In accordance with an embodiment of the filter frame, the protrusion is wedge-shaped and the notch is V-shaped. Thereby, the protrusion is guided into the notch at assembly.

In accordance with an embodiment of the filter frame, each gable plate has at least one V-shaped plate portion extending between the front edge portion and an opposite rear edge portion of the gable plate, with the top of the V facing the front edge portion, said at least one V-shaped portion being defined by a channel arranged to receive a gable of the media pack.

In accordance with an embodiment of the filter frame, it further comprises a rear plate engaged with rear edge portions of the first and second gable plates. The rear plate stabilizes the filter frame structure.

In accordance with a second aspect of the present invention there is provided a method of assembling a filter frame comprising:

providing a front plate, which comprises a groove at each one of two opposite ends thereof;

providing first and second gable plates, and mounting them at the front plate, including for each gable plate; inserting a front edge portion of the gable plate into a respective groove, and forcing a retainment member provided at the front edge portion into engagement with a corresponding retainment member of the front plate.

BRIEF DESCRIPTION OF THE DRAWINGS

The invention will now be described in more detail and with reference to the appended drawings in which.

DESCRIPTION OF PREFERRED EMBODIMENTS

Figure 1A:
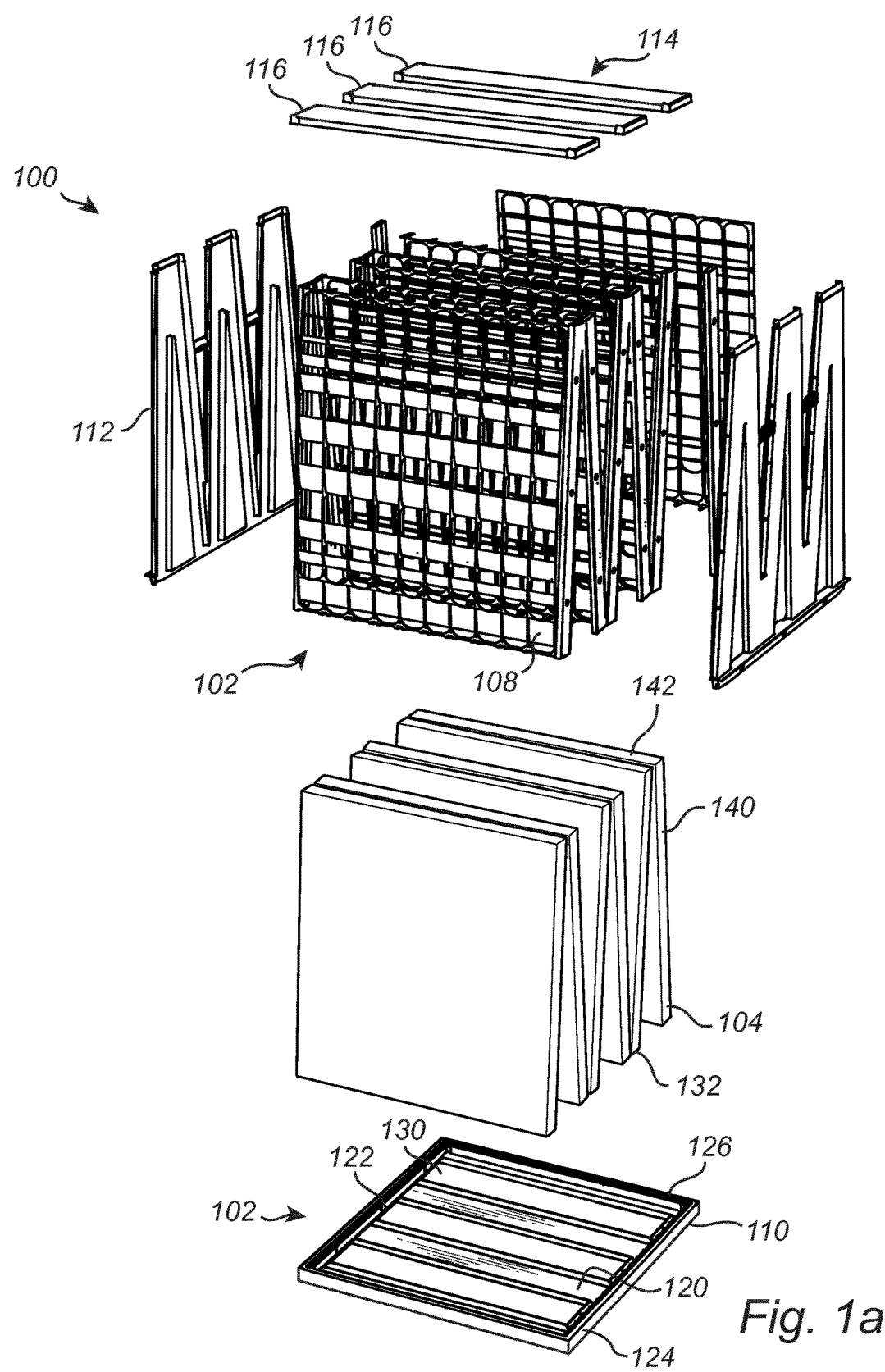
FIG. 1*a* is a schematic exploded view of an embodiment of a filter assembly according to the invention.
Figure 1B:
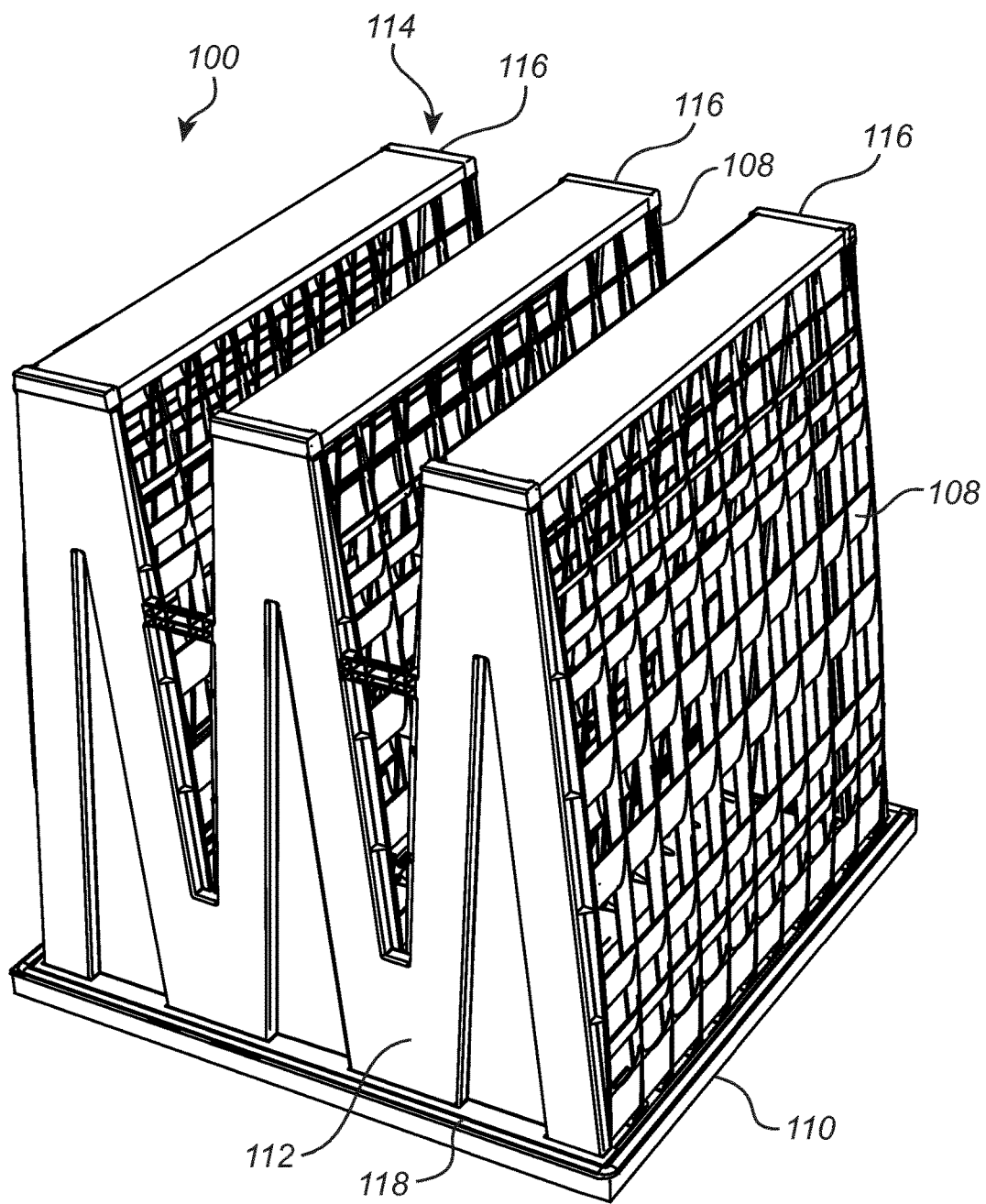
FIG. 1*b* is a perspective view of the filter assembly of FIG. 1*a*.
Figure 2A:
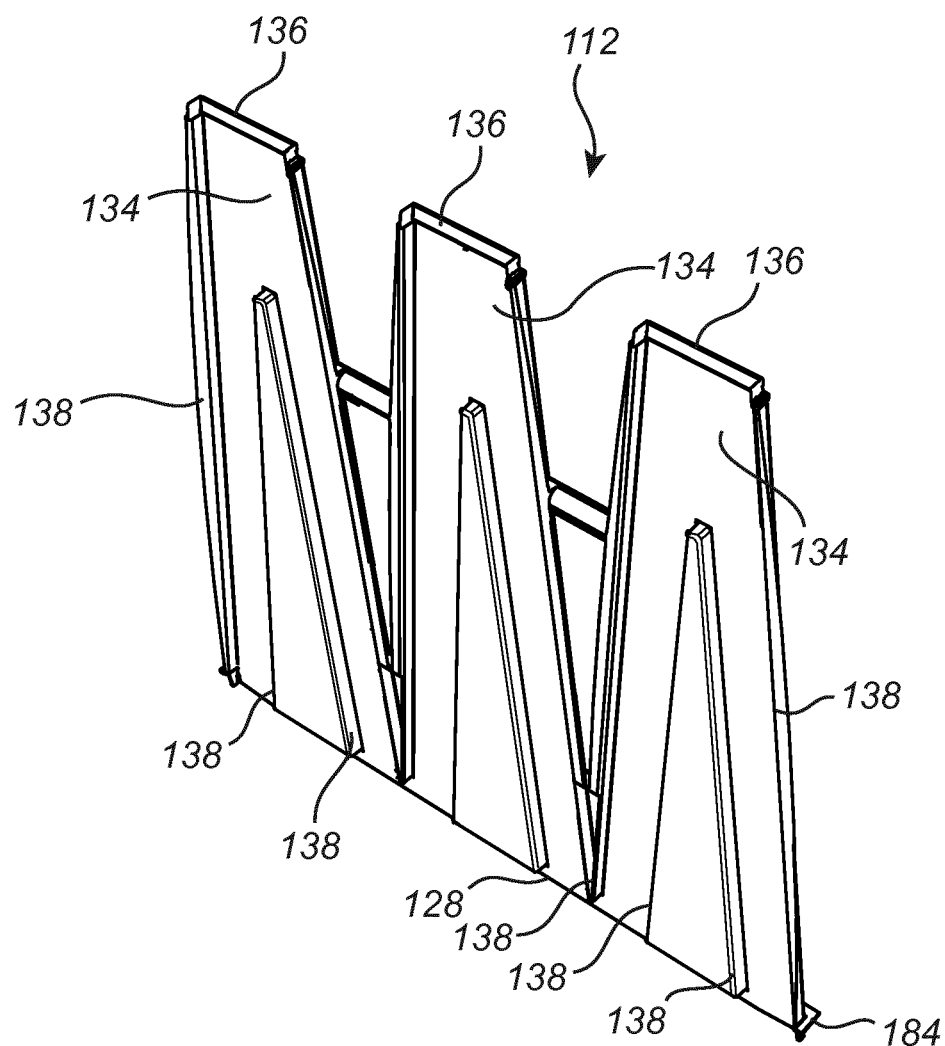
FIGS. 2*a*-2*f* are schematic views of filter frame parts of the filter assembly.
Figure 2B:
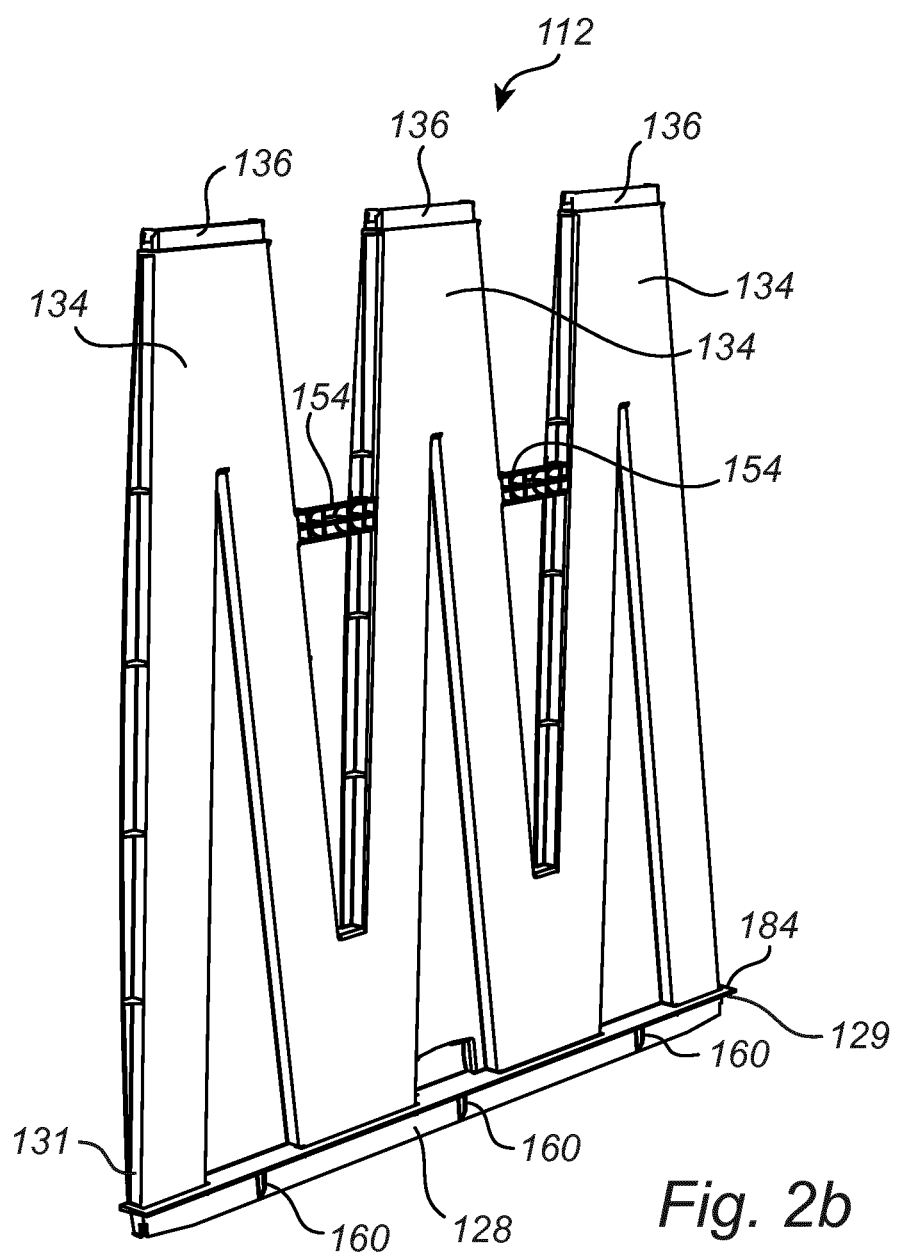
Figure 2C:
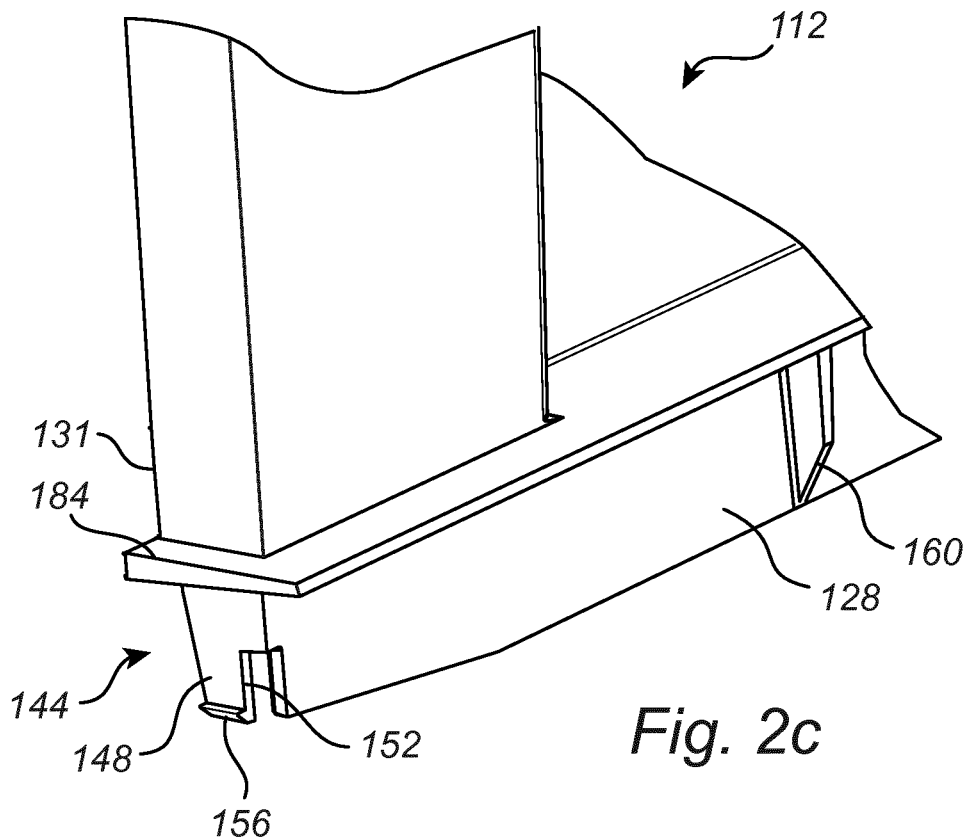
Figure 2D:
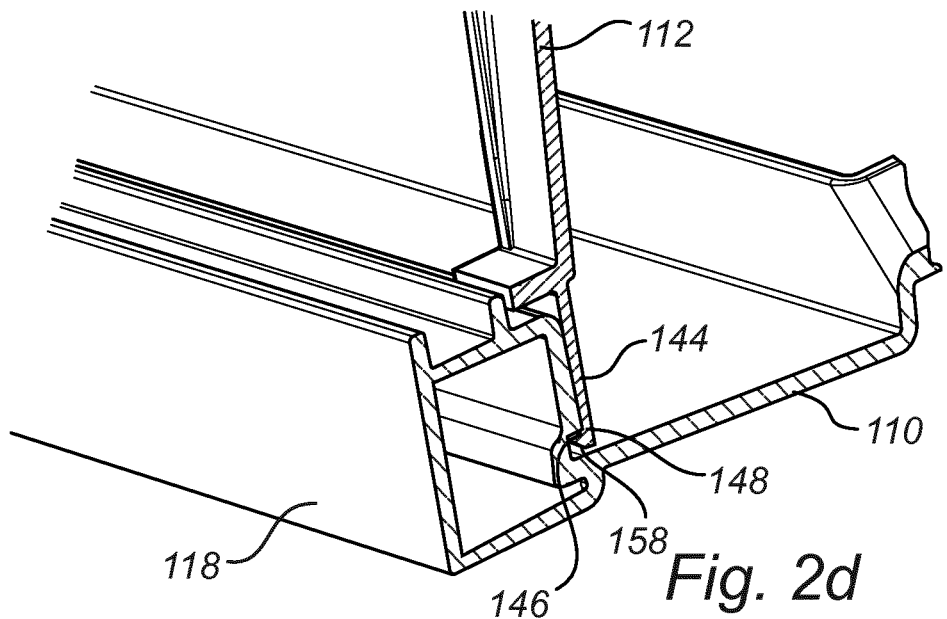
Figure 2E:
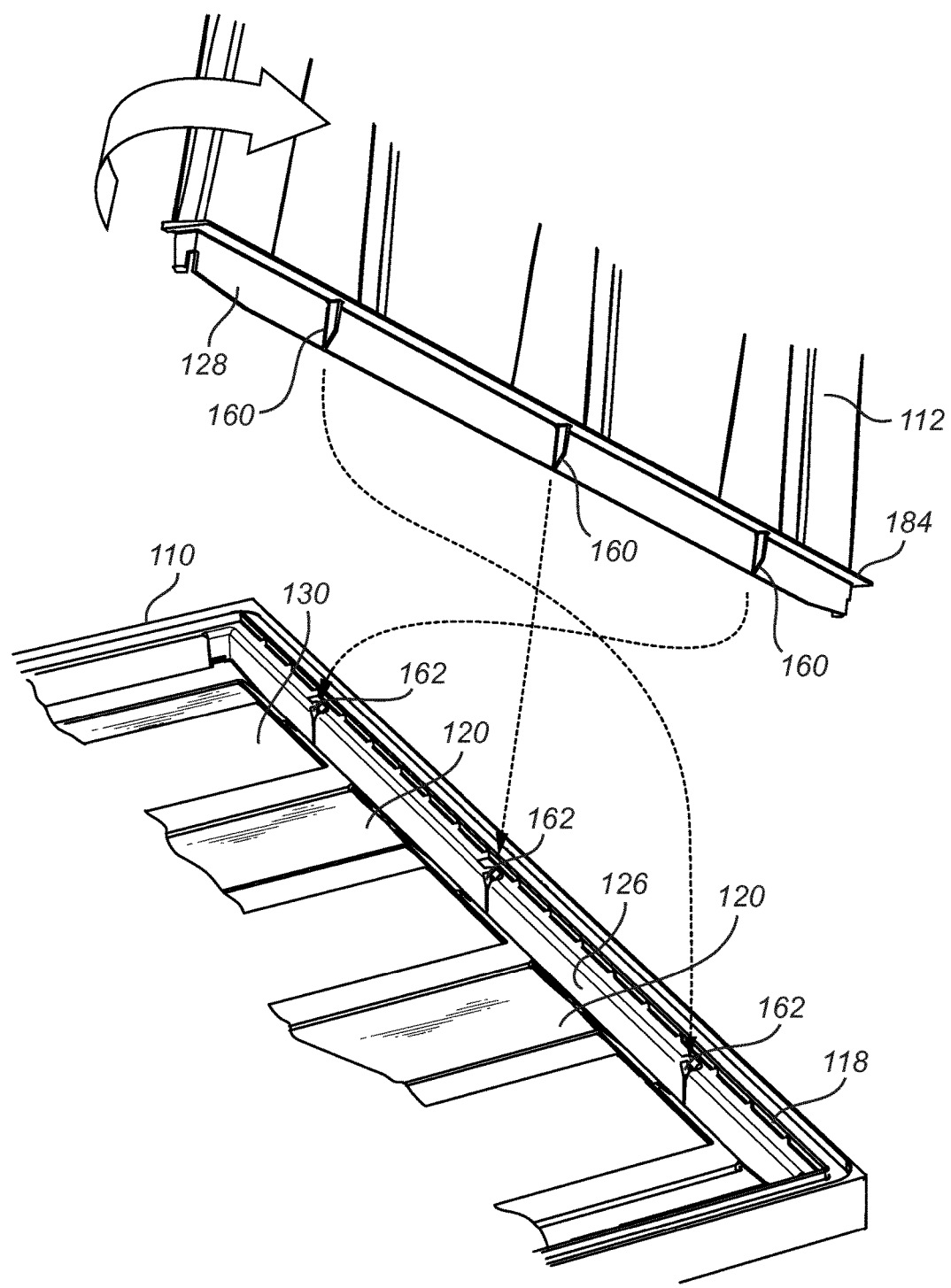
Figure 2F:
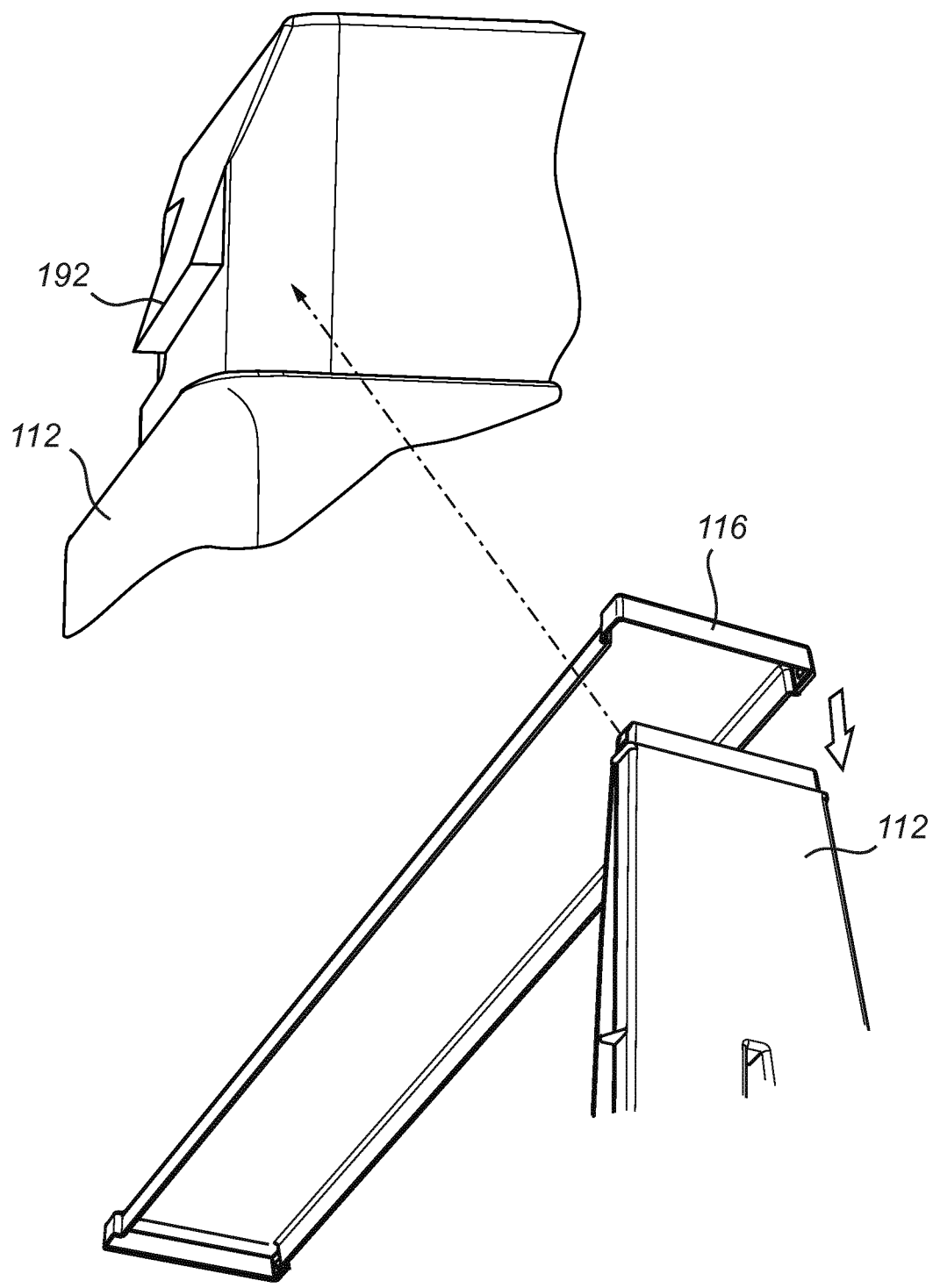

According to an embodiment of the filter assembly 100, it comprises an embodiment of the filter frame 102, and several, in this embodiment six, media packs 104, carried by the filter frame 102, whereby the media packs 104 have been shown separately in FIG. 1a for reasons of clarity. The media packs 104 can be of any suitable kind, but typically each media pack 104 comprises a sheet of filter media 106, which has been pleated to an accordion shape in order to increase the effective filtering area of the filter body, and backing nets 108 containing the pleated sheet of filter media 106. Backing nets 108 are arranged to let air pass through the filter media 106, or even arranged to guide the passing air in a preferred direction and optimized for low pressure drop thereover.

The filter frame 102 comprises a front plate 110, two gable plates 112, and a rear plate 114, embodied by three separate plate elements 116. The front plate 110 is rectangular and comprises a peripherally extending rim 118, and parallel ribs 120 extending between opposite ends 122, 124 of the front plate 110. The front plate 110 has a groove 126 at each of the ends 122, 124. Each groove 126 extends along a respective portion of the rim 118 at an inside thereof, and adjacent thereto. The gable plates 112 are arranged at the opposite ends 122, 124 of the front plate 110. Each gable plate 112 has a front edge portion 128, which has been received in the groove 126. Each gable plate 112 extends perpendicular to the front plate 110, and rearwards therefrom. The media packs 104 are plate shaped and extend obliquely substantially in the direction of the air flow from the front plate 110, although they extend close to perpendicular to the front plate 110. The media packs 104 are arranged side by side, leaning alternately to one side and to the other side, thereby forming a zigzag structure. More particularly, they are arranged in pairs, each pair forming a V shape, such that the mouth of the V shape faces the front plate 110. A front edge 132 of each media pack 104 abuts against one of the ribs 120, and apertures 130 between the ribs 120 are aligned with the mouths of the V shapes. Each gable plate 112 has three V-shaped portions 134 extending between the front edge portion 128 and an opposite rear edge portion 136 of the gable plate 112, with the mouth of each V-shaped portion 134 facing the front edge portion 128. The V-shaped portions 134 are joined along a minor fraction of their length, extending from the mouth towards the other end, while there are gaps between them along a major part of their length. Reinforcing elements 154 may be provided extending between two adjacent V-shaped portions to further increase the structural rigidity of the gable plate 112. These reinforcing elements 154 can also serve as grips when handling the gable plates 112 or (semi-) assembled filter frame assemblies 100. Each V-shaped portion 134 is defined by a channel, having side walls 138. Each V-shaped channel has received gable portions, or side edge portions, 140 of two media packs 104. Of course, it is also possible within the scope of the appended claims for the gable plates 112 to have additional or less than three V-shaped portions, such as one, two, four or more. Also, the gable plates 112 may not have V-shaped portions at all but may for example be provided in the form of covering having a trapezoid shape or similar without openings between adjacent pairs of media packs. Each plate element 116 of the rear plate 114 covers rear edge portions 142 of two media packs 104 forming a V-shape. The plate elements 116 each extend between, and are attached to, a respective fraction of the rear edge portion 136 of each gable plate 112. Consequently, the front plate 110, the gable plates 112, and the rear plate 114 support each other to form a strong filter frame 102, which carries the media packs 104.

An important part of the filter frame structure is the engagement between the gable plates 112 and the front plate 110. As mentioned above, each one of the gable plates 112 has been received in a respective groove 126 of the front plate 110. In order to secure a proper engagement between the front plate 110 and the gable plates 112, each gable plate is provided with a retainment member 144, and the front plate 110 is provided with a complementary retainment member 146 for each gable plate 112. The retainment member 144 of each gable plate 112 comprises a snap-lock element 148 at either side of the gable 112, and more particularly at each end of the front edge portion 128, at a side edge 129, 131 of the gable plate 112. The snap-lock element 148 comprises a resilient tongue 152, which extends perpendicular or at an angle to a front edge of the gable plate, and which has a shoulder 156. The complementary retainment member 146 comprises a recess 158, which is arranged at the rim 118 of the front plate 110. The shoulder 156 has been received in the recess 158. Thereby the gable plate 112 is in fixed engagement with the front plate 110. However, in order to further enhance the stability of the engagement, the retainment member 144 further comprises three protrusions 160, which protrude from the front edge portion 128 perpendicular to the primary extension of the gable plate 112. The protrusions 160 are distributed along the length of the front edge portion 128. The complementary retainment member 146 further comprises three notches 162, which are arranged at the rim 118 of the front plate 110, one notch at each respective protrusion. The protrusions 160 have been received in the notches 162. Each protrusion 160 is wedge-shaped, and each notch 162 is V-shaped. The sizes of the protrusions 160 and the notches 162 are such that they are connected to each other in a press fit when the gable plate 112 is inserted into engagement with the front plate 110. The snap-lock elements 148 and the press fit connection between the protrusions 160 and notches 162 ensure a reliable coupling between the gable plates 112 and the front plate 110 even without the use of any adhesives such that the filter frame can be handled, e.g. lifted and moved around, without the need of any temporary securing means or similar. It should be noted that as regards the retainment member 144, the number of protrusions 160 can range from zero to several, and the number of snap-lock elements 148 can range from zero to several as well. It is desired to have at least one snap-lock element or protrusion, and it is preferred to have two snap in elements with the shown placement and at least one protrusion.

Figure 3:
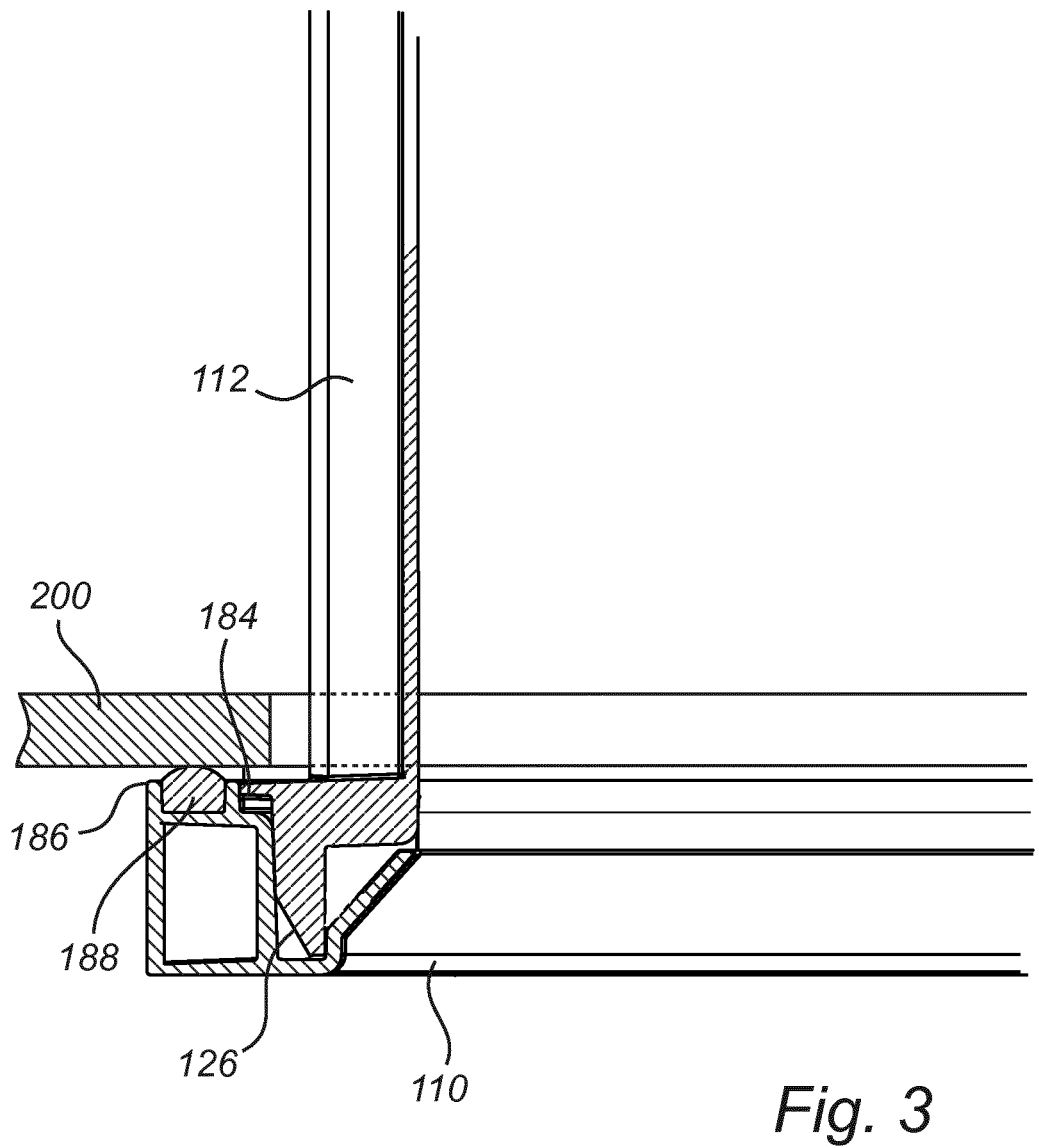
FIG. 3 is a schematic cross-section of filter frame parts according to the invention.

In FIG. 3 it is shown that the gable plates 112 each comprises an abutment surface 184 near the front edge portion 128. This abutment surface 184 is intended to bear against a filter bank grid 200, made for example from steel beams, when mounted thereto. The front plate 110 is provided with a sealing surface 186 having a sealing member 188, here in the form of a sealing strip made from polyurethane or similar. The sealing surface 186 is flush with the abutment surface 184 when the gable plates 112 are mounted to the front plate 110 such that both surfaces will bear against the filter bank grid when mounted thereto. It should be noted that in FIG. 3, for reasons of clarity, the abutment surface 184 of the gable plate 112 and sealing surface 186 of the front plate 110 are not yet in contact with the filter bank grid 200. Instead, FIG. 3 shows a position where the sealing member 188 barely touches the grid 200. It is also possible, and sometimes preferable, to arrange the sealing surface 186 of the front plate 110 forwardly displaced relative the abutment surface 184. If, for example, a thick and/or less compressible sealing member 188 is used, too much load may be transferred to the front plate 110 if the sealing surface 186 and abutment surface 184 are arranged flush with each other. By arranging the sealing surface 186 somewhat forwardly displaced relative the abutment surface 184, the abutment surface 186 will reach the front surface of grid 200 earlier, thus not requiring excessive compression of the sealing member 188. As will be described below, the filter frame assembly is to be fastened by means of clamps or similar that firmly squeeze the filter frame assembly 100 against the filter bank grid 200. When this is done the sealing member 188 will be compressed and the abutment surface 184 of the gable plate will bare against the filter bank grid 200 in a load absorbing manner. This results in that the forces originating from the air flowing through the filter media will be transmitted directly from the media pack 104 to the gable plates 112 and thereafter to the filter bank grid and only a minor part of these forces, if any at all, will be transmitted to the filter bank grid by the front plate 110. This is favorable since the connection and sealing between the front plate 110 and gable plates 112 will not be exposed to any substantial stress, thereby avoiding air leakage between them. The abutment surface 184 is here executed in the form of a flange running the whole width of a front part of an outer side of the gable plate 112 as well as on the side edges 129, 131. This ensures uniform load transfer and good sealing properties between sealing surface 186 and the filter bank grid 200. Other forms of execution of the flange are of course possible, for example in order to increase structural stability of the flange.

The filter frame is assembled as follows. The front plate 110, comprising the grooves 126 at the two opposite ends 122, 124 thereof is provided. The first and second gable plates 112 are provided and mounted at the front plate 110. For each gable plate 112 the mounting includes inserting a front edge portion 128 of the gable plate 112 into a respective groove 126, and forcing the retainment member 144 into engagement with the corresponding retainment member 146 of the front plate 110. Thereby a part of the filter frame 102 which is ready to receive the media packs 104 has been assembled. In order to complete the assembling process to a complete filter assembly 100, the next step thus is to mount the media packs 104 including backing nets 108, and then the plate elements 116 of the rear plate 114 are mounted, wherein they are forced into engagement with the rear edge portions 136 such that snap-lock elements 192 of the gable plates 112 snaps into a locking position in the corresponding part in each rear plate 116. As mentioned earlier, the filter assembly is now ready to be handled and could for example be transported to a different location without the necessity of any temporary securing means or similar. And then, in a last step of assembling the filter frame, an adhesive is used to seal and fixate the filter frame 102. The mere presence of adhesive in the spaces between the different constructional details will prevent the snap-lock elements from leaving their locked position, which adds rigidity to the structure even before the adhesive has cured. Obviously, curing will further increase rigidity and stability of the structure by bonding the gable plates 112 and the front plate 110 together. Since the retainment member 144 will be glued into engagement with the corresponding retainment member 146 the snap-lock connection and the press fit connection respectively will become even stronger. Other modes of mounting are obviously also possible, such as intermediate supply of adhesive.

Thereafter, the filter frame assembly is inserted and secured to the filter bank grid 200, typically the filter frame assembly is clamped to the filter bank grid 200 by means of a plastic or metal clamp which is fixed to the filter bank grid by means of a bolt and a fly nut or similar. Thereby, the filter frame assembly can be tightly squeezed between the clamp and the grid 200 without the use of through bolts or similar that would jeopardize tightness of the construction. When doing so, both the abutment surface 184 of the gable plate 112 and the sealing surface 186 of the front plate 110 are pressed against the filter bank grid 200 such that sealing is assured. When in use, the forces acting on the filter media 106 due to the air flow there through will be transmitted directly from the gable plates 112 to the filter bank grid 200 and no major forces will be transmitted from the gable plates 112 to the front plate 110 such that the sealing properties between the gable plates 112 and the front plate 110 can be maintained at all times.

Finally, it is realized that the use of structure of the present invention with retainment members 144, 146 is a more user-oriented solution than known prior art constructions since it allows for a user to handle the frame assembly without the need of any temporary securing means or similar before the adhesive has been added and allowed to cure. Further, the provision of an abutment surface on the gable plate and a sealing surface on the front plate provides a construction with increased load bearing capacity while at same time improving sealing properties of the filter frame assembly. It should also be noted that the positions of the retainment member and the complimentary retainment member could be altered, e.g. the snap-lock could just as well be arranged on the front edge of the gable plate and the protrusion on the side edge of the gable plate and the corresponding goes for the complimentary parts of the front plate.

The invention claimed is:
1. A filter frame configured to receive multiple pairs of media packs, the filter frame comprising:
   a front plate;
   first and second gable plates arranged at opposite ends of the front plate and primarily extending perpendicular to the front plate; and
   a rear plate engaged with rear edge portions of the first and second gable plates, the rear plate engaged to each gable plate via a snap lock element,
   wherein the front plate includes a groove at each end of said opposite ends, wherein a front edge portion of each gable plate has been received in a respective one of the grooves,
   wherein each gable plate of said first and second gable plates includes multiple V-shaped plate portions extending between a front edge portion and an opposite rear edge portion of the gable plate, with a mouth of each V-shaped portion facing the front edge portion, each V-shaped portion being arranged to receive a side edge portion of a respective pair of media packs, and
   wherein each gable plate includes a retainment member arranged at the front edge portion, which retainment member has been engaged with a complementary retainment member of the front plate,
   wherein the front plate includes a plurality of ribs, at least one rib configured to abut a front edge of at least one media pack of the multiple pairs of media packs, and the front plate further includes an aperture between adjacent ribs of the plurality of ribs, such that
the front plate is configured to direct an air flow through the front plate via the aperture, and
the filter frame is configured to receive the media pack such that the media pack extends obliquely in a direction of the air flow from the front plate via the aperture,
wherein the retainment member of each gable plate includes a snap-lock element, which includes a resilient tongue extending perpendicular to a front edge of each gable plate,
wherein the resilient tongue is at a side edge of each gable plate, at an end of the groove of the front plate.

2. The filter frame according to claim 1, wherein
the resilient tongue includes a shoulder,
the complementary retainment member includes a recess, and
the shoulder has been received in the recess.

3. The filter frame according to claim 2, wherein the recess is arranged at a rim of the front plate.

4. The filter frame according to claim 1, wherein the retainment member comprises a protrusion protruding from the front edge portion perpendicular to a primary extension of the gable plate; wherein the complementary retainment member comprises a notch arranged at a rim of the front plate; and wherein the protrusion has been received in the notch.

5. The filter frame according to claim 4, wherein the protrusion is wedge-shaped and the notch is V-shaped.

6. The filter frame according to claim 1, wherein the snap lock element comprises a resilient tongue provided on each gable plate and a recess provided at said rear plate and wherein the resilient tongue extends perpendicular to said rear edge portion of each gable plate, and having a shoulder; and wherein the shoulder of the resilient tongue has been received in the recess.

7. The filter frame according to claim 1, wherein the snap lock element comprises a protrusion provided on each gable plate and extending perpendicular to said rear edge portion of the gable plate and a recess provided at said rear plate and wherein the recess is resilient such that the protrusion of the snap-lock element can be introduced into and received within the recess in locking position.

8. A filter assembly comprising a filter frame claim 1, and a media pack arranged in the filter frame.

9. A method of assembling a filter frame, the filter frame configured to receive multiple pairs of media packs, the method comprising:
providing a front plate, which comprises a groove at each end of two opposite ends thereof;
providing first and second gable plates, and mounting the first and second gable plates at the front plate, wherein each gable plate of said first and second gable plates includes multiple V-shaped plate portions extending between a front edge portion and an opposite rear edge portion of the gable plate, with a mouth of each V-shaped portion facing the front edge portion, each V-shaped portion being arranged to receive a side edge portion of a respective pair of media packs, the mounting including, for each gable plate,
inserting the front edge portion of the gable plate into a respective groove, and
forcing a retainment member provided at the front edge portion into engagement with a corresponding retainment member of the front plate, such that
the front plate includes a plurality of ribs, at least one rib configured to abut a front edge of at least one media pack of the multiple pairs of media packs, and
the front plate further includes an aperture between adjacent ribs of the plurality of ribs, such that
the front plate is configured to direct an air flow through the front plate via the aperture, and
the filter frame is configured to receive the media pack such that the media pack extends obliquely in a direction of the air flow from the front plate via the aperture; and
providing a rear plate engaged with rear edge portions of the first and second gable plates, the rear plate engaged to each gable plate via a snap lock element,
wherein the retainment member of each gable plate includes a snap-lock element, which includes a resilient tongue extending perpendicular to a front edge of each gable plate,
wherein the resilient tongue is at a side edge of each gable plate, at an end of the groove of the front plate.

* * * * *